Dec. 25, 1962     R. M. SMITH     3,070,474
BONDED GLASS SURFACES AND METHOD THEREFOR
Filed Aug. 19, 1958                2 Sheets-Sheet 1
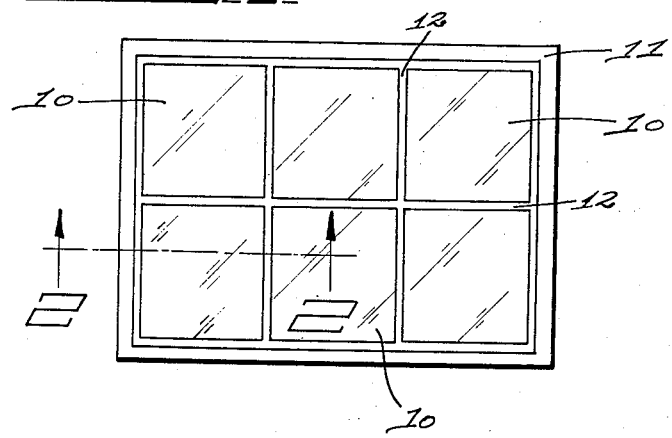
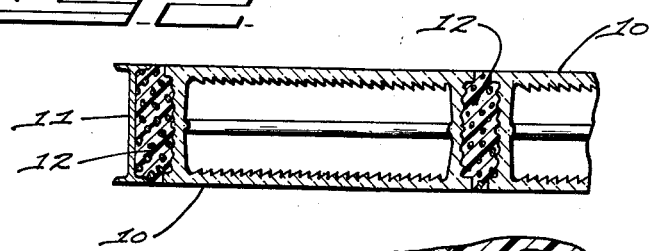
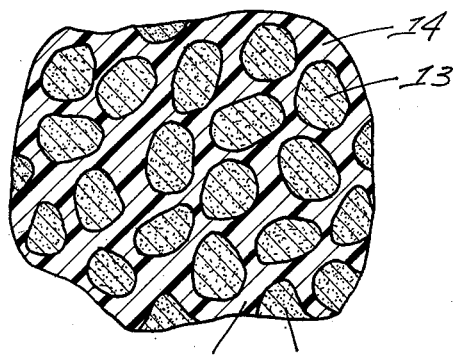
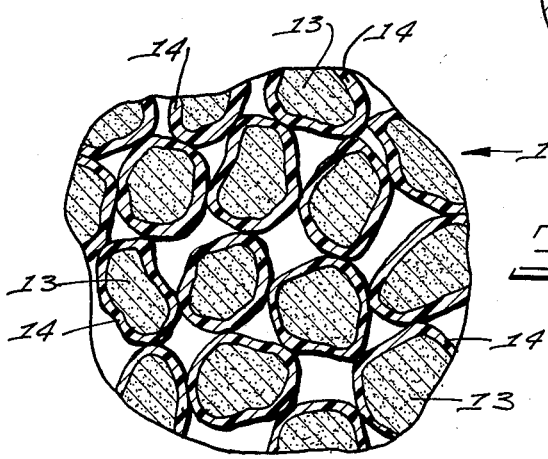
INVENTOR
ROBERT M. SMITH
BY W. A. SCHAICH &
LEONARD D. SOUBIER
ATTORNEYS Dec. 25, 1962  R. M. SMITH  3,070,474
BONDED GLASS SURFACES AND METHOD THEREFOR
Filed Aug. 19, 1958  2 Sheets-Sheet 2
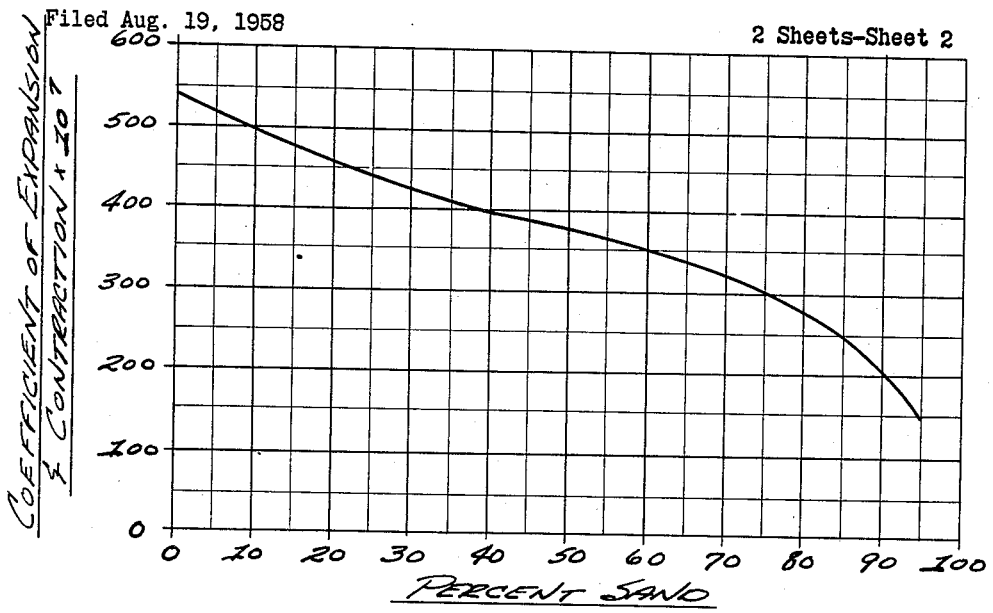
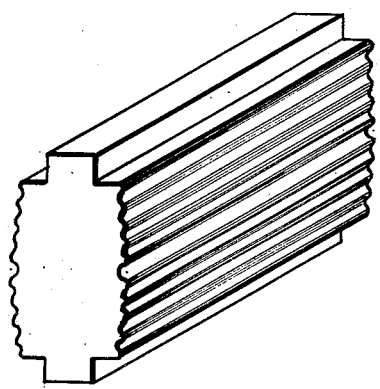
INVENTOR
ROBERT M. SMITH
BY W. A. JCHARCH &
LEONARD D. SOUBIER
ATTORNEYS

United States Patent Office 3,070,474
Patented Dec. 25, 1962

3,070,474
BONDED GLASS SURFACES AND METHOD THEREFOR
Robert M. Smith, Toledo, Ohio, assignor to Owens-Illinois Glass Company, a corporation of Ohio
Filed Aug. 19, 1958, Ser. No. 755,899
15 Claims. (Cl. 154—43)

This invention relates to bonded glass surfaces and methods of producing same, and more particularly refers in its preferred embodiments to a method for uniting glass articles, such as structural glass block, and to the improved joint formed thereby.

Although the present invention, as will be readily observed from the ensuing description, is applicable in its broad aspect to a highly improved joint and method of uniting various types of glass articles, particularly where it is desirable to obtain a strong joint between the glass articles which possesses a low coefficient of thermal expansion and contraction, for purposes of description the invention will hereinafter be described in relation to the formation of a prefabricated glass block panel structure.

In the past it has been common practice to erect glass block skylights, wall fenestrations and the like, in a manner quite similar to old established brick laying techniques, e.g., by laying each individual glass block in place and bonding same together with a suitable bonding material such as mortar or cement. However, for purposes of economy and to expedite the construction of such glass block structures, it has been found to be extremely advantageous and desirable to form a prefabricated panel composed of a plurality of such blocks which are bonded or otherwise cemented together in edgewise relationship so that the entire panel may be quickly and easily installed in the field, such as at the building site where the wall fenestration or skylight construction is desired. Cement and mortar compositions, such as have been commonly employed in the past for the construction of a wall of glass blocks which were individually placed and cemented in position at the construction site, however, are undesirable for use in bonding glass blocks together in a prefabricated panel. Most cement and mortar compositions require several hours' setting time before any substantial strength is attained. In the manufacture of prefabricated glass block panels, the use of such mortar or cement materials would necessitate immobilization of the assembled panel for prolonged periods of time and require an extensive inventory and maintenance of jigs and other associated equipment to preclude any damages or relative movement between the glass blocks and panel members. Additionally, excessive storage space would be required to accommodate the assembled panels while the cement or mortar is hardening. Accordingly, considerable money and effort have been expended toward the development of suitable bonding mediums capable of hardening within a relatively short period of time. Among bonding mediums possessing the weather resistant characteristics necessary for such a panel, thermosetting plastic resins of various types have been found to be particularly suitable.

However, a common disadvantage of most thermosetting plastic resins resides in the relatively high coefficient of thermal expansion and contraction exhibited by such materials which renders them incompatible with glass compositions most frequently utilized in the manufacture of glass block which possess a relatively low coefficient of thermal expansion and contraction. Hence, a prefabricated glass block panel constructed with a thermosetting plastic resin as the bonding means between the glass blocks is susceptible to rupture and cracking in the location of the thermosetting plastic resin joint or in the glass block itself when the panel is exposed to substantial temperature variations arising from exposure of the panel to varying weather conditions and conditions of use existent in the many different geographical locations where such prefabricated panels might be installed.

The present invention involves and has as one of its objects the formation of an improved joint between the glass blocks in a prefabricated panel structure of the type described and which possesses substantial strength, resistance to weathering and moisture penetration, as well as exhibiting a low coefficient of thermal expansion and contraction compatible with the thermal expansion and contraction characteristics of the glass block and other panel components.

A further object of this invention is to provide an improved bond between individual glass blocks contained in a multiple glass block panel structure wherein the bonding medium comprises a granular solid material having granules thereof bonded together and to the glass block surfaces by a thermosetting plastic resin forming a surface coating on substantially each granule of the solid material and defining a discontinuous or cellular matrix throughout the bonding medium.

The specific nature of this invention, as well as other objects and advantages thereof, will become apparent to those skilled in the art from the following detailed description, taken in conjunction with the annexed sheets of drawings on which, by way of example only, the preferred embodiments of this invention are illustrated, and wherein:

FIG. 1 represents a plan view of a prefabricated glass block panel assembly, and;

FIG. 2 is a sectional view along the section line 2—2 in FIG. 1, and;

FIG. 3 is a sectional view showing, for comparative purposes, the internal structure of a representative bonding material forming a joint between the glass blocks of a prefabricated panel constructed according to previous prior art practice, and;

FIG. 4 is an enlarged fragmentary view of the internal structure of the bonding material forming a joint between the glass blocks and the panel shown in FIGS. 1 and 2, according to the present invention.

FIG. 5 is a graphic representation illustrating the improved results achieved by the present invention.

FIG. 6 is a perspective view of a shaped body of the bonding material formed in accordance with a modified method of the invention.

The present invention is based upon the discovery of an improved bonding material for forming a relatively strong joint between discrete glass surfaces and specifically upon the discovery of an inexpensive bonding material for utilization with glass blocks to form a quick hardening joint between the glass blocks which is characterized by substantial strength, weather resistance and a low coefficient of thermal expansion and contraction. Although the present invention will hereinafter be described in its preferred embodiment in relation to the fabrication of a multiple glass block panel assembly, it is intended to be understood, and will be readily apparent from the following detailed description, that the invention is also suitable for bonding various other types of glass articles and surfaces, particularly where an inexpensive bonding medium having a low coefficient of thermal expansion and contraction, relatively low thermal conductivity, good strength, and substantial weather resistance is desired.

In the drawings, wherein for the purpose of illustration is shown the preferred embodiments of this invention, FIG. 1 illustrates a glass block panel having a plurality of conventional light-transmitting glass blocks 10 arranged in planar edgewise relationship within a rectangular frame 11, which is preferably fabricated from a metallic or plastic material such as light-weight aluminum, a thermosetting epoxy, phenolic or polyester resin or other material having similar properties of strength, rigidity and weather resistance. As shown in FIG. 2, the glass blocks 10 are individually held in properly oriented position within the frame 11 by a bonding material 12 which surrounds the periphery of the individual glass blocks 10 and bonds same together and to the frame 11. The frame 11 and the glass blocks 10 are illustrated as being rectangular in shape according to their most conventional shape and arrangement, but obviously the particular arrangement and shape are a matter of structural design and not intended to be a limitation herein, since, as will be apparent from the ensuing description, most any geometric configuration of the panel or its components may be utilized in the practice of the present invention.

According to the present invention, the bonding material 12 which maintains the individual glass blocks 10 in position, is preferably a mixture consisting essentially of a solid granular material and a thermosetting plastic resin, as indicated respectively by the reference characters 13 and 14, which forms an exceptionally strong, substantially weather resistant joint between the various panel components and bonds same together to form an integral panel structure. As illustrated in FIG. 4, the bonding material 12 has a cellular internal structure defined by a cellular or discontinuous matrix of the thermosetting plastic resin 14 which forms a surface coating or individual granules of the granular material 13. As will be subsequently described, the joint thus formed is characterized by a low coefficient of thermal expansion and contraction and imparts substantially improved characteristics to the entire glass block panel.

In general, the preparation of the bonding material 12 is effected by intimately mixing a liquid thermosetting resin with a fine granular solid material having a low coefficient of thermal expansion and contraction preferably approximating the coefficient of thermal expansion and contraction of the glass components, such as the glass blocks 10, which are to be joined. A fine granular sand having a grain size consisting essentially of granules between the range of 60–200 mesh by screen analysis has been found to be particularly suitable for this purpose. The relative proportions of the thermosetting resin and granular material are such that the amount by weight of granular material substantially exceeds the amount by weight of the thermosetting resin, so that the latter merely forms a surface coating on the individual solid granules without entirely filling the interstices between the randomly packed granules e.g. the thermosetting resin-granular material mixture forms an internal open lattice structure, as shown in FIG. 4, rather than a solid mass, as shown in FIG. 3. The mixture is then sandwiched between the peripheral edges of the assembled glass blocks and the thermosetting resin cured to effect a bonding together of the resin and granules to the panel components to form a unitary panel structure.

Now describing the preparation of the bonding material 12 in greater detail, a quantity of dry free flowing sand, which may be ordinary glass sand, foundry sand, such as No. 8 Wedron sand, or other granular solid material having a low coefficient of thermal expansion and contraction similarly compatible with the expansion and contraction characteristics of glass, is selected. A liquid thermosetting resin having properties of good adhesion to glass and which is preferably selected from the group consisting of epoxy, phenolic and polyester resins is then uniformly mixed with the granular material to form a blend having a weight ratio of granular material in the range of about 85–97% and a weight ratio of thermosetting resin in the range of about 3–15%. The mixing of the granular material and resin may be carried out in a ribbon mixer, cement mixer, muller or other conventional mixing apparatus suitable for mixing materials having a thick consistency.

In accordance with one preferred embodiment of this invention, a plurality of glass blocks 10 are positioned side-by-side in planar edgewise spaced relationship within the frame 11 to form a panel arrangement, as shown in FIG. 1, and the spaces between the edges of the glass blocks and the frame 11 are filled with a freshly prepared mixture of bonding material 12 prepared in accordance with the method just described. The mixture 12 which has a very thick consistency, may be lightly tamped or otherwise fed into the spaces around the glass blocks 10, as for example, by utilizing a conventional high pressure pump or screw feeder with a hose and nozzle attachment, not illustrated.

As an alternative procedure, the thermosetting resin-granular solid mixture may be molded into wet preforms, having a shape conforming to the edge configuration of the glass blocks 10, as shown in FIG. 6. Other wet preforms of the mixture not shown may be similarly molded to fit between the glass blocks 10 and the frame 11. The wet preforms are then individually fitted into position in the spaces between the glass blocks 10 and the frame 11 and when the preforms are subsequently cured they function as mullions or transoms bonding the glass blocks in assembled position.

Regardless of which of the above procedures is utilized, the thermosetting resin is then cured and polymerized and forms an extremely strong joint between the panel components having an open lattice structure or cellular structure, as shown in FIG. 4, in which the surfaces of the individual grains of the granular material 13 are randomly bound together by the cured thermosetting resin 14 to form a joint having a low coefficient of thermal expansion and contraction closely approximating the expansion and contraction characteristics of the glass blocks 10. The curing of the thermosetting resin 14 may be effected with a suitable catalyst and/or heat well known in the art and the choice of which will be largely dependent upon which particularly type of thermosetting resin is employed.

Specific examples of mixtures of the above-type found to be particular suitable are exemplified as follows:

*Example I*

Sand/resin ratio _____ 85/15=5.67

Weight percent of:
    Commercial glass sand_____ 83.91
    Liquid epoxy resin_____ 14.82
    Diethylene triamine catalyst_____ 1.19

*Example II*

Sand/resin ratio _____ 95/5=19.0

Weight percent of:
    Commercial glass sand_____ 94.62
    Liquid epoxy resin_____ 4.98
    Diethylene triamine catalyst_____ .40

*Example III*

Sand/resin ratio _____ 95/5=19.0

Weight percent of:
    Commercial glass sand_____ 94.71
    Liquid epoxy resin dissolved in acetone_____ 4.98
    Meta-phenylene diamine catalyst_____ .30

For purposes of convenience, the epoxy resin may be obtained in commercially prepared form. One such preparation found to be particularly suitable is available from Shell Chemical Company, under the trademark "Epon 828." Other suitable epoxy resin preparations, also available from the aforementioned supplier, are distributed under the trademarks "Epon 815," "Epon 820," "Epon 834" and "Epon 1001." The latter epoxy resin preparations differ principally in molecular weight and viscosity and, accordingly, the selection of the most suitable epoxy resin preparation may vary in individual situations according to the molecular weight and viscosity characteristics desired. Also, Example III above illustrates a suitable resin and catalyst preparation where it is desirable for the resultant sand-resin mixture to cure under the influence of applied heat. Examples I and II illustrate resin-catalyst preparations which are capable of curing without application of heat to the mixture.

By varying the weight ratio of resin to granular material it has been found that the coefficient of thermal expansion and contraction of the polymerized bonding material 12 may likewise be varied. Specific examples of sand-resin mixtures having sand/resin ratios varying from 0.33 to 19.0 are set out in Examples IV–XIII following. The coefficient of thermal expansion and contraction of the resultant cured sand-resin mixtures corresponding to Examples IV–VIII is graphically represented in FIG. 5.

*Example IV*

Sand/resin ratio _____ 25/75=0.33

Weight of:
   Commercial glass sand _____ gms__ 25
   Liquid epoxy resin _____ gms__ 75
   Diethylene triamine catalyst _____ gms__ 6

*Example V*

Sand/resin ratio _____ 50/50=1.0

Weight of:
   Commercial glass sand _____ gms__ 50
   Liquid epoxy resin _____ gms__ 50
   Diethylene triamine catalyst _____ gms__ 4

*Example VI*

Sand/resin ratio _____ 75/25=3.0

Weight of:
   Commercial glass sand _____ gms__ 75
   Liquid epoxy resin _____ gms__ 25
   Diethylene triamine catalyst _____ gms__ 2

*Example VII*

Sand/resin ratio _____ 90/10=9.0

Weight of:
   Commercial glass sand _____ gms__ 90
   Liquid epoxy resin _____ gms__ 10
   Diethylene triamine catalyst _____ gms__ 0.8

*Example VIII*

Sand/resin ratio _____ 95/5=19.0

Weight of:
   Commercial glass sand _____ gms__ 95
   Liquid epoxy resin _____ gms__ 5
   Diethylene triamine catalyst _____ gms__ 0.4

As graphically indicated in FIG. 5, as the ratio of thermosetting resin to granular sand decreases there is a corresponding decrease in the coefficient of thermal expansion and contraction. In this regard, it is significant to note that the coefficient of thermal expansion and contraction of the cured mixture decreases rapidly as the ratio of sand is increased above 75%, and this is believed to be due to the fact that the resin content is insufficient in amount to form a continuous matrix throughout the mixture when the granular solid content is increased above 75–85%. Further, since the coefficient of thermal expansion and contraction of the cured and polymerized thermosetting resin is substantially higher than that of the granular solid material, it is believed that, due to the resulting open lattice network of the matrix of the bonding material 12, as shown in FIG. 4 of the drawings, the principal factor influencing the expansion and contraction characteristics of the bonding material 12 is the coefficient of thermal expansion and contraction of the granular solid material rather than the expansion and contraction characteristics of the thermosetting resin, as would be the case where the matrix of the bonding material 12 were a continuous phase, such as is shown in FIG. 3. Hence, by reducing the resin content of the mixture below about 25%, as in the specific Examples I, II and III above, the coefficient of thermal expansion and contraction of the resulting bonding material 12, and consequently the joint, are rapidly decreased.

Among other advantages, and irrespective of which of the aforedescribed embodiments is utilized, it will be apparent that the present invention provides for a bonding material, which although suitable for forming an improved joint between most any glass surfaces or articles, is exceptionally suitable for bonding light-transmitting glass blocks together in a pre-fabricated panel assembly. The bonding material is capable of being cured and polymerized to a hardened state within a period of time appreciably shorter than heretofore experienced with various cement and mortar compositions. Thus, manufacturing costs may be substantially reduced. Further, the panel may be subjected to substantial temperature changes without damage resulting from excessive differential expansion and contraction of the panel components. Thus, the panel may be effectively utilized in many different geographic locations and climates. Additionally, since the bonding material consists essentially of an inexpensive granular solid material, such as sand for example, the raw material costs for the preparation of the bonding material are exceptionally low.

It will of course be understood that various details of the present invention may be modified throughout a wide range without departing from the principles thereof, and it is, therefore, not the purpose to limit the patent granted hereon otherwise than as necessitated by the scope of the appended claims.

I claim:

1. A method of bonding individual glass surfaces together to form a composite structure comprising the steps of: uniformly mixing together a finely divided granular solid material and a polymerizable thermosetting liquid resinous material having the property of good adhesion to glass, the relative proportions of said solid material and said liquid resinous material being selected in such amounts that the latter as a result of said mixing forms a coating substantially covering each of the granules of solid material without completely filling the interstices occurring between said granules; sandwiching the mixture so formed between said glass surfaces; and polymerizing said resinous coating to bond said glass surfaces together with a resin-solid mixture containing voids.

2. The method as defined in claim 1 wherein said granular solid material and said liquid resinous material are present in a weight ratio of from about 3 to 30 parts by weight of said resinous material to 97 to 70 parts by weight of said granular solid material.

3. The method as defined in claim 1 wherein said granular solid material and said liquid resinous material are present in a weight ratio of from about 3 to 15 parts by weight of said resinous material to 97 to 85 parts by weight of said granular solid material.

4. The method as defined in claim 1 wherein said finely divided granular solid material is sand.

5. The method as defined in claim 4 wherein said sand has a grain size of from 60–200 mesh.

6. The method according to claim 1, wherein said granular solid material possess a coefficient of thermal expansion and contraction closely approximating the coefficient of thermal expansion and contraction of said glass.

7. The method according to claim 1, wherein said granular solid material consists essentially of a siliceous material.

8. A method of claim 1 wherein said resin is a phenolic resin.

9. A method of claim 1 wherein said resin is a polyester resin.

10. A method of bonding individual glass surfaces together to form a composite structure comprising, the steps of: uniformly mixing together a finely divided granular solid material and a polymerizable thermosetting liquid resinous material having the property of good adhesion to glass, the relative proportions of said solid material and said liquid resinous material being selected in such amounts that the latter as a result of said mixing forms a coating substantially covering each of the granules of solid material without completely filling the interstices occurring between said granules, said resinous coating being an epoxy resin; sandwiching the mixture so formed between said glass surfaces; and polymerizing said resinous coating to thereby bond said glass surfaces together with a resin-solid mixture containing voids.

11. A method of bonding individual glass surfaces together, comprising the steps of: sandwiching between said glass surfaces a mass of particulate solid granules having a polymerizable thermosetting resinous coating substantially covering each solid granule, said resinous coating possessing properties of good adhesion to glass; said resinous coating being present in said mass in a weight ratio such that a coating of said resinous material substantially covers each of the granules of solid material without completely filling the interstices occurring between said granules, said ratio lying in the range of about 3 to 30 parts of resinous material to about 97 to 70 parts of solid granules; and polymerizing said resinous coating while said mass is in contact with said glass surfaces and thus bonding said glass surfaces with a resin-solid mixture containing voids.

12. A method of bonding individual glass surfaces together, comprising the steps of: shaping a plastic mass of finely divided granular solids having a polymerizable thermosetting resinous coating on substantially each granule into a shaped body of material having a configuration conforming to the shape of the glass surfaces which are to be joined, said resinous coating being one possessing properties of good adhesion to glass; thereafter sandwiching the conforming surface portions of said shaped body and said glass surfaces together in mating relationship; and polymerizing said resinous coating while said shaped body is sandwiched between said glass surfaces.

13. A method of bonding individual glass blocks together, comprising the steps of: uniformly mixing together a finely divided granular solid material and a polymerizable thermosetting liquid resinous material having the property of good adhesion to glass, the relative proportions of said solid material and said liquid resinous material being selected in such amounts that the latter as a result of said mixing forms a coating substantially covering each of the granules of solid material without completely filling the interstices occurring between said granules; shaping the mixture so formed into a shaped body having surface portions conforming substantially to the shape of the glass block surfaces which are to be joined; sandwiching said shaped body between said glass block surfaces; and polymerizing said resinous material while said shaped body is in contact with said glass block surfaces and thus bonding said glass block surfaces with a resin-solid mixture containing voids.

14. In combination, plurality of glass construction units arranged in side-by-side spaced relationship in a single plane and having adjacent surfaces bonded together by a cellular mass, said cellular mass comprising discrete granules of solid material randomly dispersed therein and interfacially bonded together by a polymerized thermosetting resin having properties of good adhesion to glass, said thermosetting resin defining a matrix containing randomly disposed voids.

15. A glass block panel assembly having a plurality of glass blocks arranged in side-by-side spaced apart relationship and bonded together by a cellular bonding material, said bonding material consisting essentially of discrete solid granules randomly dispersed and interfacially bonded together by a polymerized thermosetting resin having properties of good adhesion to glass, said resin defining a matrix containing randomly disposed voids.

References Cited in the file of this patent
UNITED STATES PATENTS

| | | |
|---|---|---|
| 1,929,425 | Hermann | Oct. 10, 1933 |
| 2,052,229 | Hyde | Aug. 25, 1936 |
| 2,102,149 | Guthrie | Dec. 14, 1937 |
| 2,333,723 | Jordan | Nov. 9, 1943 |
| 2,512,996 | Bixler | June 27, 1950 |
| 2,514,141 | Phillips | July 4, 1950 |
| 2,734,812 | Robie | Feb. 14, 1956 |
| 2,768,563 | Ommerman | Oct. 30, 1956 |
| 2,806,509 | Bozzacco et al. | Sept. 17, 1957 |
| 2,810,989 | Terry | Oct. 29, 1957 |
| 2,835,623 | Vincent et al. | May 20, 1958 |
| 2,956,281 | McMillan et al. | Oct. 11, 1960 |